US012591759B2

(12) United States Patent
Chakaravarthy et al.

(10) Patent No.: US 12,591,759 B2
(45) Date of Patent: Mar. 31, 2026

(54) PARALLEL AND DISTRIBUTED PROCESSING OF PROPOSITIONAL LOGICAL NEURAL NETWORKS

(71) Applicant: INTERNATIONAL BUSINESS MACHINES CORPORATION, Armonk, NY (US)

(72) Inventors: Venkatesan Thirumalai Chakaravarthy, Karnataka (IN); Anamitra Roy Choudhury, Vasant Kunj (IN); Naweed Aghmad Khan, Johannesburg (CA); Francois Pierre Luus, Wierdapark (CA); Yogish Sabharwal, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 980 days.

(21) Appl. No.: 17/804,107

(22) Filed: May 26, 2022

(65) Prior Publication Data
US 2023/0385599 A1 Nov. 30, 2023

(51) Int. Cl.
*G06N 3/04* (2023.01)
*G06N 3/08* (2023.01)

(52) U.S. Cl.
CPC ................. *G06N 3/04* (2013.01); *G06N 3/08* (2013.01)

(58) Field of Classification Search
None
See application file for complete search history.

(56) References Cited

U.S. PATENT DOCUMENTS

| | | |
|---|---|---|
| 2021/0150323 A1 | 5/2021 | Turek |
| 2021/0318878 A1 | 10/2021 | Zhao |
| 2021/0365817 A1 | 11/2021 | Riegel |
| 2023/0325642 A1 * | 10/2023 | Tang ...................... G06N 3/045 |

FOREIGN PATENT DOCUMENTS

JP          2016021262 A          2/2016

OTHER PUBLICATIONS

Riegel, R., Gray, A., Luus, F., Khan, N., Makondo, N., Akhalwaya, I. Y., . . . & Srivastava, S. (2020). Logical neural networks. arXiv preprint arXiv:2006.13155. (Year: 2020).*
Riegel, R., Gray, A., Luus, F., Khan, N., Makondo, N., Akhalwaya, I. Y., . . . Srivastava, S. (2020). Logical Neural Networks. arXiv [ Cs.AI]. Retrieved from http://arxiv.org/abs/2006.13155 (Year: 2020).*

(Continued)

*Primary Examiner* — Omar F Fernandez Rivas
*Assistant Examiner* — Corey M Sackalosky
(74) *Attorney, Agent, or Firm* — Teddi Maranzano

(57) ABSTRACT

An embodiment may include a processor that identifies a plurality of weights from the propositional logical neural network. The embodiment may convert the plurality of weights into a sparse matrix. The embodiment may convert a training set into a plurality of bound vectors. The embodiment may update the sparse matrix using a graphical processing unit (GPU). The embodiment may compute a loss parameter and based on determining the loss function is below threshold, update the plurality of weights of the propositional neural network.

20 Claims, 8 Drawing Sheets

(56) References Cited

OTHER PUBLICATIONS

Shi, S., Chen, H., Zhang, M., & Zhang, Y. (2019). Neural Logic Networks. arXiv [Cs.AI]. Retrieved from http://arxiv.org/abs/1910.08629 (Year: 2019).*

B. T. Low, "Neural-Logic Belief Networks-A tool for knowledge representation and reasoning," Proceedings of 1993 IEEE Conference on Tools with AI (TAI-93), Boston, MA, USA, 1993, pp. 34-37, doi: 10.1109/TAI.1993.633933 (Year: 1993).*

H. H. Teh, L. S. Hsu, S. C. Chan and K. F. Loe, "Temporal neural logic networks," [1990] Proceedings of the 2nd International IEEE Conference on Tools for Artificial Intelligence, Herndon, VA, USA, 1990, pp. 372-376, doi: 10.1109/TAI.1990.130365. (Year: 1990).*

Sekiyama, T., & Suenaga, K. (2018). Automated proof synthesis for propositional logic with deep neural networks. arXiv [Cs.AI]. Retrieved from http://arxiv.org/abs/1805.11799 (Year: 2018).*

T. J. Reynolds, H. H. Teh and B. T. Low, "Neural logic programming," [1990] Proceedings of the 2nd International IEEE Conference on Tools for Artificial Intelligence, Herndon, VA, USA, 1990, pp. 485-491, doi: 10.1109/TAI.1990.130385. (Year: 1990).*

Abusalim et al., "Comparative Analysis between Dijkstra and Bellman-Ford Algorithms in Shortest Path Optimization," International Conference on Technology, Engineering and Sciences (ICTES) 2020, IOP Conf. Series: Materials Science and Engineering 917 (2020) 012077, doi: 10.1088/1757-899X/917/1/012077, 12 pages.

Li et al., "Efficient Mini-batch Training for Stochastic Optimization," ACM, KDD'14, Aug. 24-27, 2014, http://dx.doi.org/10.1145/2623330.2623612, 10 pages.

Mell et al., "The NIST Definition of Cloud Computing", National Institute of Standards and Technology, Special Publication 800-145, Sep. 2011, 7 pages.

Meng et al. "Training Deeper Models by GPU Memory Optimization on TensorFlow," 31st Conference on Neural Information Processing Systems (NIPS 2017), http://learningsys.org/nips 17/assets/papers/paper_18.pdf, 8 pages.

Riegel et al., "Logical Neural Networks," arXiv:2006.13155v1 [cs.AI] Jun. 23, 2020, https://arxiv.org/pdf/2006.13155.pdf, 48 pages.

Github, " IBM / TensorLNN," Github.com, Accessed: May 26, 2022, https://github.com/IBM/TensorLNN, 7 pages.

* cited by examiner

100

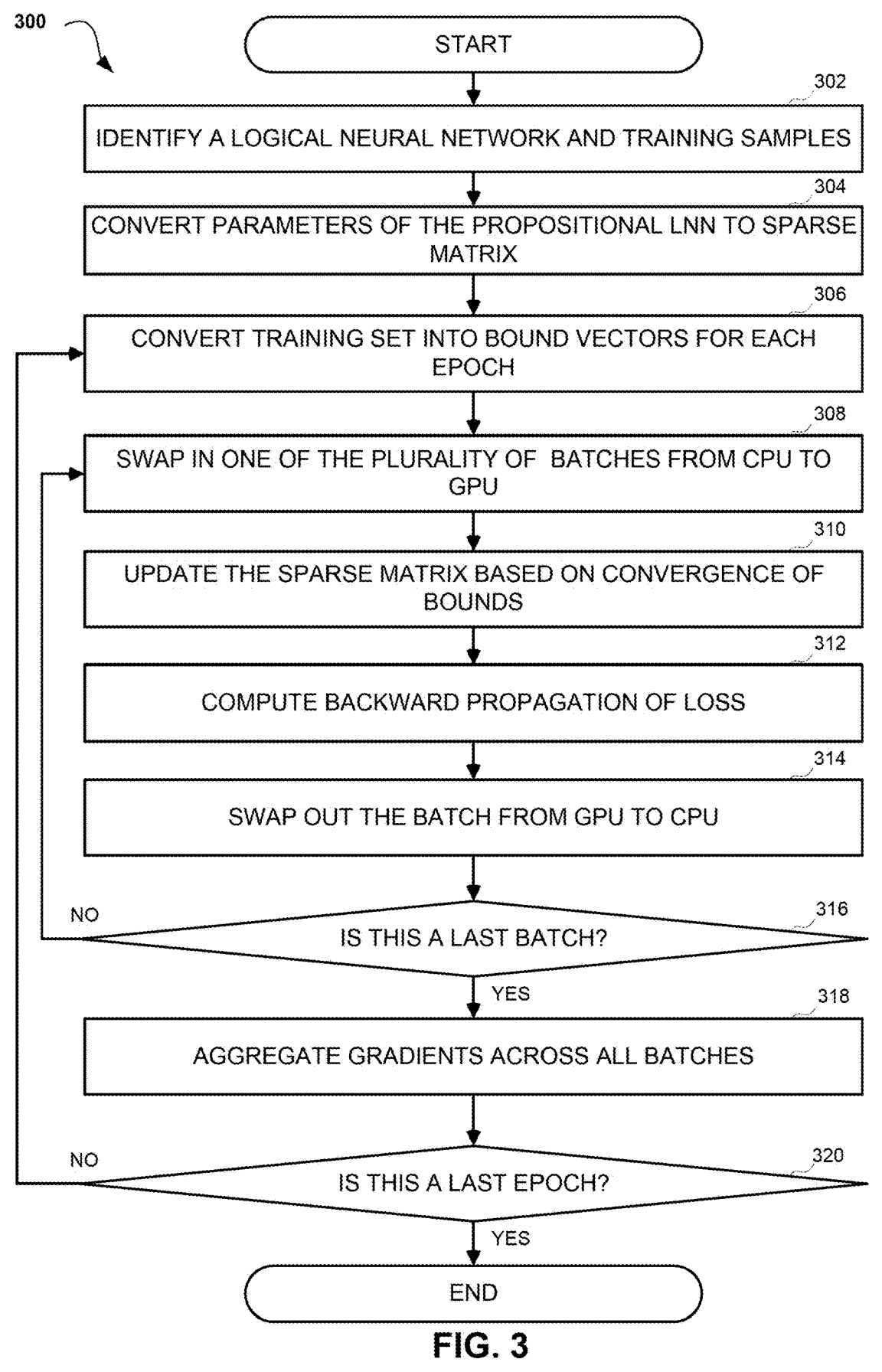

300

START

302

IDENTIFY A LOGICAL NEURAL NETWORK AND TRAINING SAMPLES

304

CONVERT PARAMETERS OF THE PROPOSITIONAL LNN TO SPARSE MATRIX

306

CONVERT TRAINING SET INTO BOUND VECTORS FOR EACH EPOCH

308

SWAP IN ONE OF THE PLURALITY OF BATCHES FROM CPU TO GPU

310

UPDATE THE SPARSE MATRIX BASED ON CONVERGENCE OF BOUNDS

312

COMPUTE BACKWARD PROPAGATION OF LOSS

314

SWAP OUT THE BATCH FROM GPU TO CPU

316

IS THIS A LAST BATCH?    NO

YES

318

AGGREGATE GRADIENTS ACROSS ALL BATCHES

320

IS THIS A LAST EPOCH?    NO

YES

END

FIG. 3

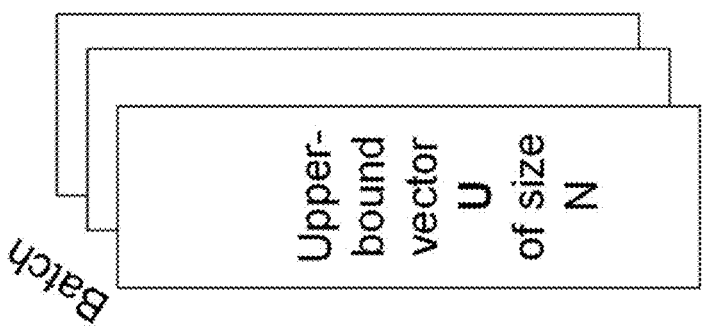
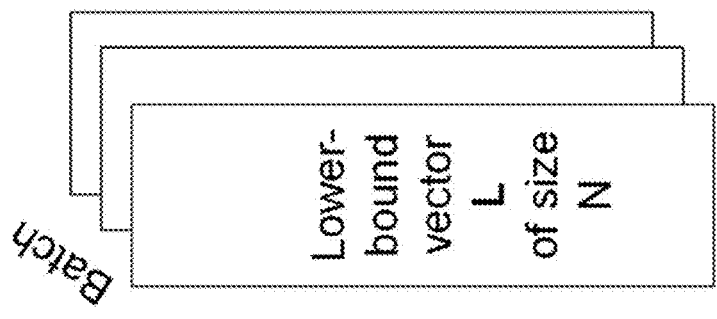
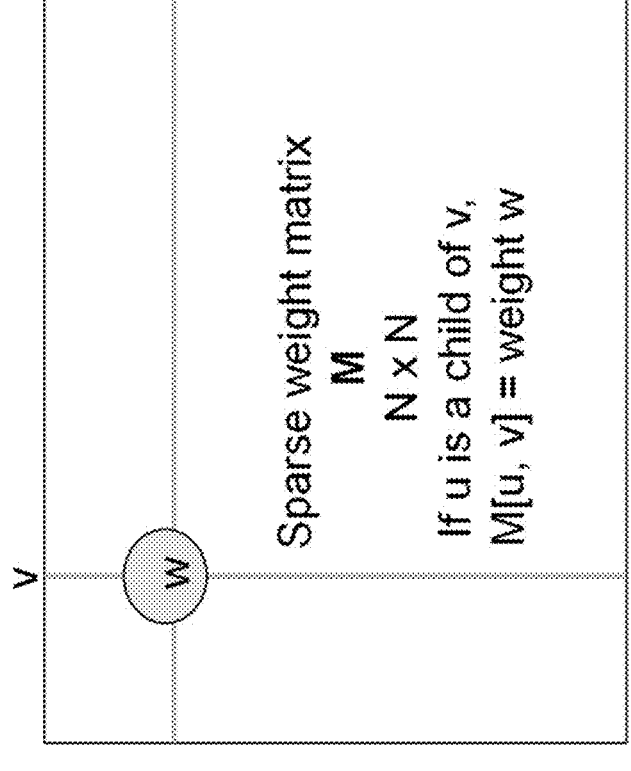
FIG. 4A

PARALLEL AND DISTRIBUTED PROCESSING OF PROPOSITIONAL LOGICAL NEURAL NETWORKS

BACKGROUND

The present invention relates, generally, to the field of computing, and more particularly to artificial neural networks.

Artificial neural networks, typically called neural networks (NNs), are computing systems inspired by the biological neural networks that constitute brains. The neural network is based on a collection of connected units or nodes called artificial neurons, which loosely model the neurons in a biological brain. Each connection, like the synapses in a biological brain, can transmit a signal to other neurons. An artificial neuron receives a signal then processes it and can signal neurons connected to it. The "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times.

The logical neural network (LNN) is a form of recurrent neural network with a 1-to-1 correspondence to a set of logical formulae in any of various systems of weighted, real-valued logic, in which evaluation performs logical inference. The graph structure therefore directly reflects the logical formulae it represents. The LNN is typically used in question answering systems that is enabled to derive Boolean formulas from samples. A propositional LNN is an LNN that captures uncertainties in truth values of the Boolean logic thus, uses intervals instead of true or false values and incorporates weights on the edges to amplify a component.

SUMMARY

According to one embodiment, a method, computer system, and computer program product for distributed/parallel processing (training or inference) of a propositional logical neural network is provided. An embodiment may include a processor that identifies a plurality of weights from the propositional logical neural network. The embodiment may convert the plurality of weights into a sparse matrix. The embodiment may convert a training set into a plurality of bound vectors. The embodiment may update the sparse matrix using a graphical processing unit (GPU). The embodiment may compute a loss parameter and based on determining the loss function is below threshold, update the plurality of weights of the propositional neural network.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 3 depicts an example of propositional logical neural network training process according to at least one embodiment;

FIGS. 4A and 4B depict a sparse weight matrix and a distributed processing of the training respectively of the propositional logical neural network training process according to at least one embodiment.

DETAILED DESCRIPTION

Figure 1:
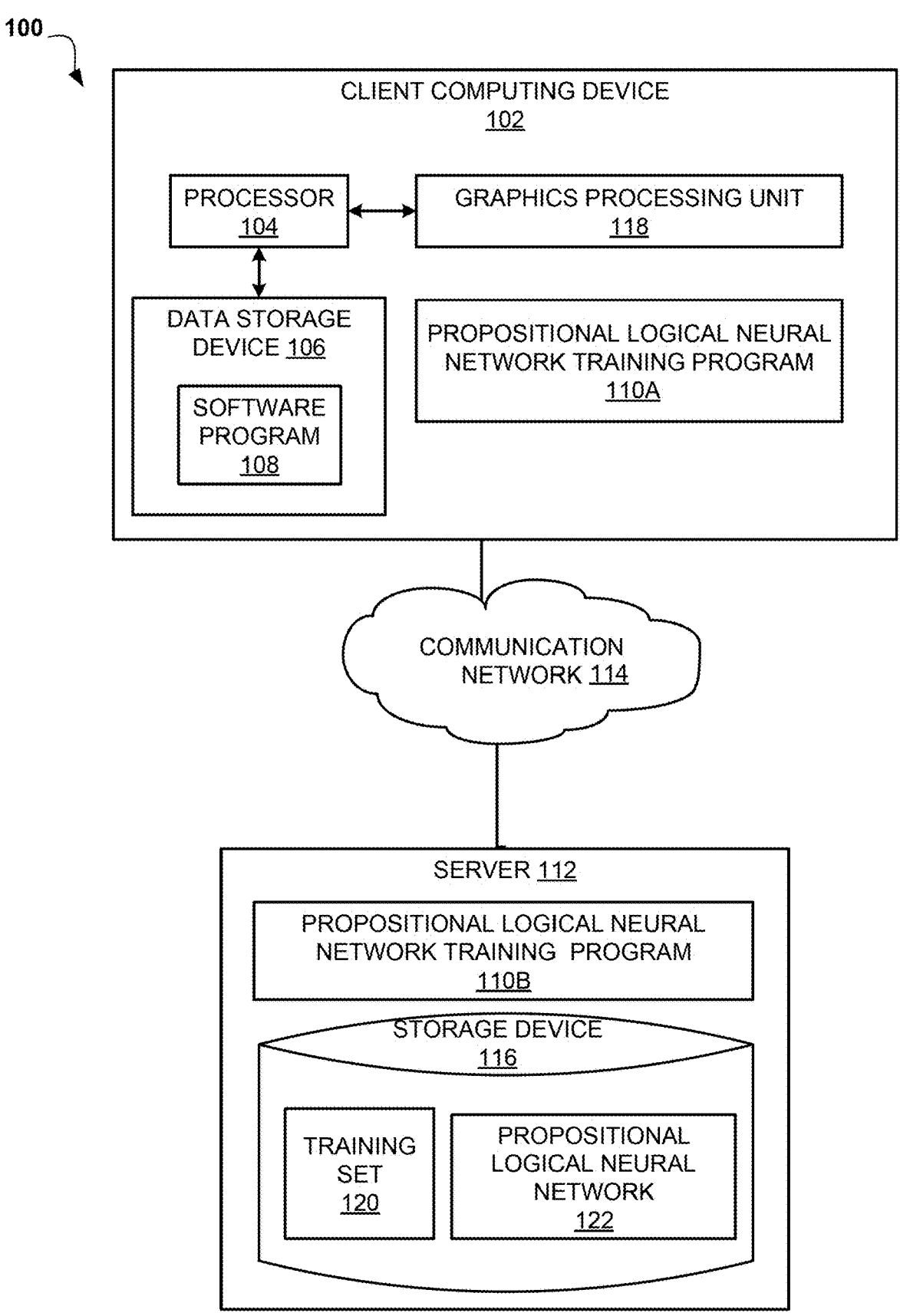
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to artificial neural networks. The following described exemplary embodiments provide a system, method, and program product to, among other things, train (and infer) propositional logical neural networks utilizing parallel and distributed processing. Therefore, the present embodiment has the capacity to improve the technical field of training of propositional logical neural networks utilizing sparse dense matrix approach that allows simultaneous inference on the nodes by utilizing linear algebraic kernels of accelerators such as the Graphic Processing Units (GPUs).

As previously described, the logical neural network (LNN) is a form of recurrent neural network with a 1-to-1 correspondence to a set of logical formulae in any of various systems of weighted, real-valued logic, in which evaluation performs logical inference. The graph structure therefore directly reflects the logical formulae it represents. The LNN is typically used in question answering systems that is enabled to derive Boolean formulas from samples. A propositional LNN is an LNN that captures uncertainties in truth values of the Boolean logic thus, uses intervals instead of true or false values and incorporates weights on the edges to amplify a component.

Training of propositional LNNs require multiple upward and downward inferences for each epoch that update the weights associated with each node. Typically, the inferences are continued in a loop until convergence of the nodes occurs. Because the inference is performed layer by layer no parallelism capabilities of a computing device can be utilized. As such, it may be advantageous to, among other things, implement a method that converts the weights and bounds of the propositional LNN into a sparse weight matrix and, by utilizing linear algebraic kernels, enables concurrent updates of all weights in a distributed fashion, thus reducing training time of the propositional LNN.

According to one embodiment, training of a propositional neural network may be performed in parallel rather than performing inferences from node-to-node. This may be accomplished by initially identifying a propositional LNN and an associated training set. The propositional LLN may be converted into a sparse matrix of weights while the training set is converted into one or more batches of vectors, and, by utilizing linear algebraic functions over GPUs, a loss function may be computed while the weights are updated simultaneously in the matrix as described in detail below.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to train a propositional LNN in a distributed manner by converting the LNN structure into a sparse matrix of weights and utilizing linear algebra to train the propositional LNN using GPU.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104, a graphics processing unit (GPU) 118 and a data storage device 106 that is enabled to host and run a software program 108 and a propositional linear neural network (LNN) training program 110A and communicate with the server 112 via the communication network 114, in accordance with one embodiment of the invention. According to an embodiment of the current invention, the GPU 118 is a specialized electronic circuit designed to rapidly manipulate and alter memory to accelerate the creation of images in a frame buffer intended for output to a display device. The GPU 118 is efficient at manipulating computer graphics and image processing. The highly parallel structure of GPU 118 makes it more efficient than general-purpose central processing units (CPUs) for algorithms that process large blocks of data in parallel. The GPU 118 may be integrated in processor 104. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server 112 may be a laptop computer, netbook computer, personal computer (PC), a desktop computer, or any programmable electronic device or any network of programmable electronic devices capable of hosting and running a propositional linear neural network (LNN) training program 110B and a storage device 116 that stores training set 120 and propositional logical neural network 122. The server 112 may communicate with the client computing device 102 via the communication network 114, in accordance with embodiments of the invention. In another embodiment, the training set 120 and the propositional logical neural network 122 may be located on data storage device 108. As previously mentioned, the propositional logical neural network is an LNN that captures uncertainties in truth values of the Boolean logic that uses intervals instead of true or false values and incorporates weights on the edges to amplify a corresponding node. the propositional logical neural network 122 may be stored as a database, an array or as a pointer sequence. As will be discussed with reference to FIG. 5, the server computer 112 may include internal components 502b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the propositional LNN training program 110A, 110B may be a program capable of analyzing a structure of the propositional LNN to identify the relations between various nodes and, based on the relations, construct a sparse matrix of weights in order to perform parallel training of the propositional LNN using the GPU. The parallel and distributed propositional LNN training method is explained in further detail below with respect to FIGS. 2 and 3.

Figure 2:
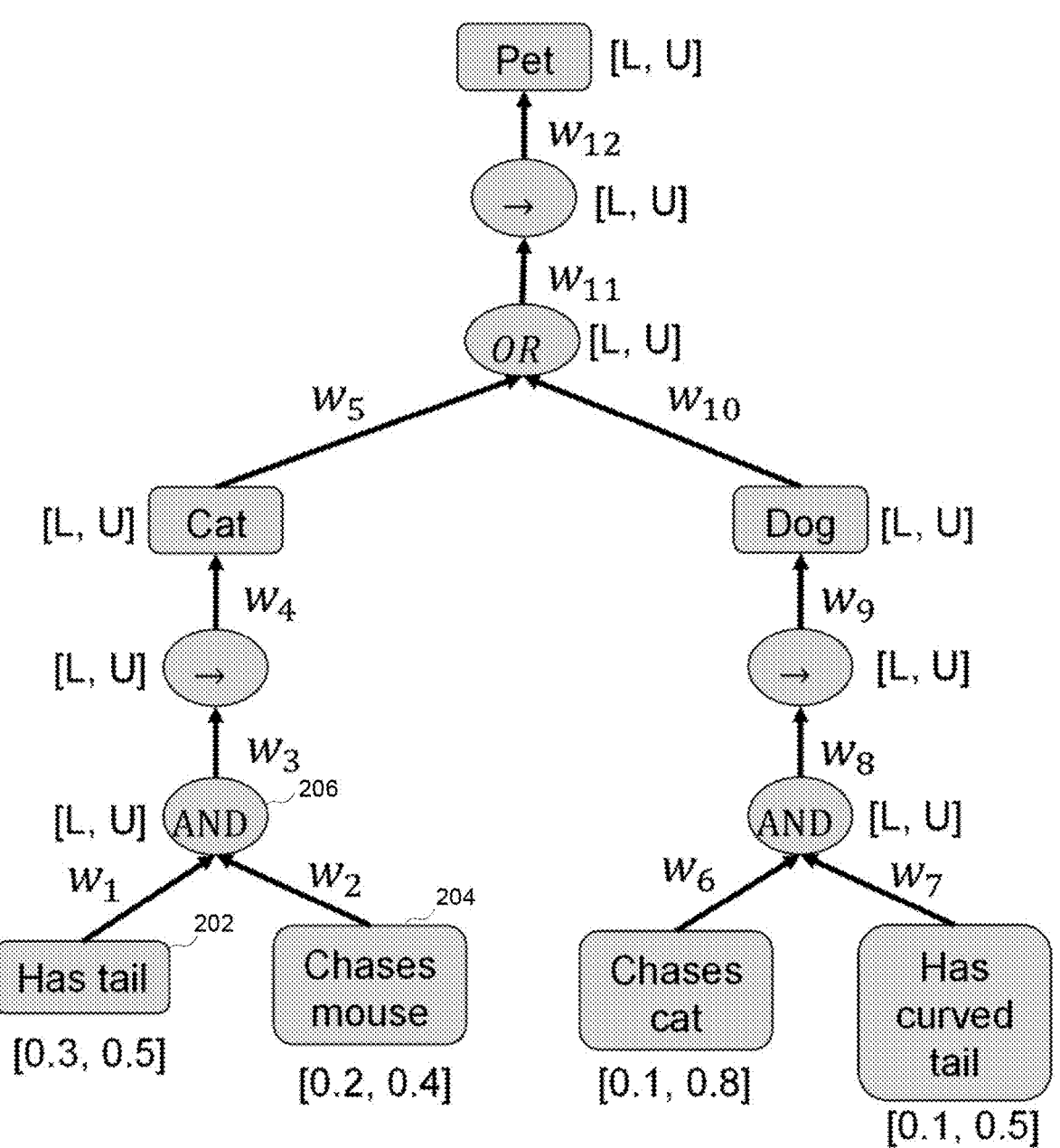
FIG. 2 depicts a propositional logical neural network according to at least one embodiment.

Referring now to FIG. 2, an example of propositional logical neural network is depicted according to at least one embodiment. According to an example embodiment, a propositional LNN may determine whether something is a pet, such as a cat or a dog, based on inputs, such as whether it has a tail, chases mouse etc. The propositional LNN may comprise a plurality of nodes interconnected in layers using logical operators, while each node has an associated weight, such as weights $w_1$ to $w_{12}$ that are updated during training of the propositional LNN. Each node, such as node 202, has an interval of [L, U] in the range of [0, 1] taken from a training set. For example, node 202 has a probability in the range of 0.3 to 0.5 while the result is amplified using a weight $w_1$. In order to perform logical operations with probability ranges, a Lukasiewicz Logic may be utilized for logical operations and activation of nodes, such as:

$$\text{Negation: } \sim A = (1 - A)$$

$$\text{Disjunction (OR): } A \oplus B = \min\left[1, \frac{w_A}{w_{A \oplus B}} \cdot A + \frac{w_B}{w_{A \oplus B}} \cdot B\right]$$

$$\text{Conjunction (AND): } A \,\&\, B = \max\left[0, 1 - \frac{w_A}{w_{A\&B}} \cdot (1 - A) - \frac{w_B}{w_{A\&B}} \cdot (1 - B)\right]$$

$$\text{Implication } (\rightarrow): A \rightarrow B = \min\left[1, \frac{w_A}{w_{A \rightarrow B}} \cdot (1 - A) + \frac{w_B}{w_{A \rightarrow B}} \cdot B\right]$$

For example, node 206 is a Conjunction operator that is determined using child nodes 202 and 204.

Referring now to FIG. 3, an operational flowchart illustrating a propositional logical neural network training process 300 is depicted according to at least one embodiment. At 302, the propositional LNN training program 110A, 110B identifies a logical neural network and training samples. According to an example embodiment, the propositional LNN training program 110A, 110B may request a user to enter a path or a database location of the propositional LNN and training samples using a graphical user interface (GUI). For example, training samples may be located on server 112 as a training set 120 while the propositional LNN as propositional logical neural network 122.

Next, at 304, the propositional LNN training program 110A, 110B converts parameters of the propositional LNN to a sparse matrix. According to an example embodiment, the propositional LNN training program 110A, 110B may identify all of the weights of the nodes, that may be stored in a separate array or as a dataset of the LNN, and arrange the weights in a sparse matrix where the location of each weight in the sparse matrix is defined by relations of the nodes or identifying numbers of the nodes. For example, the propositional LNN training program 110A, 110B may place a weight w in matrix M at the location M[u, v] when node u is a child of node v or vice versa. In addition, the propositional LNN training program 110A, 110B may locate all of the lower bounds of each node in the propositional LNN and convert the values into lower bound vector L while the upper bound values into vector U for each training example. For further explanation, see FIG. 4A and accompanying description below.

Then, at 306, the propositional LNN training program 110A, 110B converts the training set into bound vectors for each training set. According to an example embodiment, the propositional LNN training program 110A, 110B may identify, for the current training set, the upper and lower bounds of each node and arrange them into U and L bound vectors. In another embodiment, the propositional LNN training program 110A, 110B may update the sparse matrix based on previous epoch changes to the weights. For further explanation, see FIG. 4A and accompanying description below.

Figure 4B:
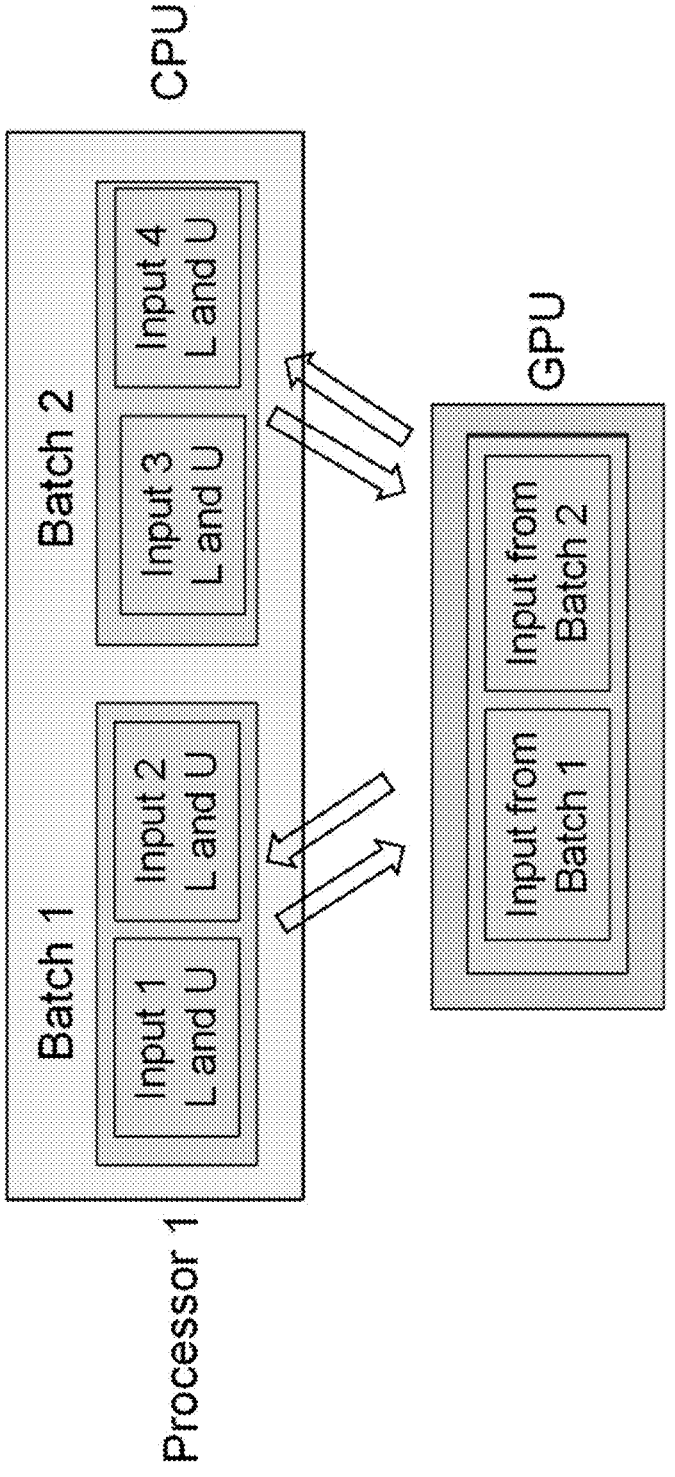

Next, at 308, the propositional LNN training program 110A, 110B swaps in one of the plurality of batches from CPU to GPU. According to an example embodiment, the propositional LNN training program 110A, 110B may identify an optimal size of the GPU memory and utilize the memory for optimal parallel processing of the calculations. For example, if the memory of the GPU is less than the size of the batch, the propositional LNN training program 110A, 110B may divide the batch into a plurality of mini batches and swap them to GPU in a parallel fashion as depicted in FIG. 4B.

Then, at 310, the propositional LNN training program 110A, 110B updates the sparse matrix based on a convergence of bounds. According to an example embodiment, the propositional LNN training program 110A, 110B may utilize sparse kernel calls such as sparse-dense-matrix-multiplication (Sparse-MM) and sparse-matrix-row-sum calls to update all of the weights of the batch or mini batch in the GPU until convergence of bounds using parameters of the L and U vectors.

Next, at 312, the propositional LNN training program 110A, 110B computes backward propagation of loss. According to an example embodiment, the propositional LNN training program 110A, 110B may partition the inputs (L and U vectors) and distribute them equally among all of the available processors. Then the propositional LNN training program 110A, 110B based on an assumption that the loss function is additive, aggregated loss data from each input and determine a loss function as a superposition or a sum of loss data of each batch and mini batch.

Then, at 314, the propositional LNN training program 110A, 110B swaps out the batch from the GPU to the CPU. According to an example embodiment, the propositional LNN training program 110A, 110B may update the sparse matrix based on swapping the batches or mini-batches back and forth from a CPU to a GPU for faster calculations. After the weights of each batch or mini batch are updated and the loss function of the batch is determined, the propositional LNN training program 110A, 110B may swap the batch or mini batch out of the GPU to the CPU.

Next, at 316, the propositional LNN training program 110A, 110B determines whether this is a last batch. According to an example embodiment, each sparse matrix and vectors from a training sample are divided into a plurality of batches for parallel processing where each batch has a unique identifier thus, when the identifier of the batch equals a value associated with a last batch, the last batch is being processed. In another embodiment, a batch may have a Boolean value (True or False) that represents whether the batch is a last batch. If the propositional LNN training program 110A, 110B processing the last batch (step 316, "YES" branch), the propositional LNN training program 110A, 110B may continue to step 318 to aggregate gradients across all batches. If the propositional LNN training program 110A, 110B determines that this is not a last batch (step 316, "NO" branch), the propositional LNN training program 110A, 110B may return to step 308 to swap in one of the plurality of batches from CPU to GPU.

Then, at 318, the propositional LNN training program 110A, 110B aggregates gradients across all batches. According to an example embodiment, the propositional LNN training program 110A, 110B may store all of the weight updates on storage device 116 or data storage device 106 and aggregate them at the end of the epoch processing in the sparse matrix that represents the weights of the propositional LNN.

Next, at 320, the propositional LNN training program 110A, 110B determines whether this is a last epoch. According to an example embodiment, the propositional LNN training program 110A, 110B may check whether the loss function parameters are below a threshold value to determine whether an additional epoch is required. If the propositional LNN training program 110A, 110B determines that the loss function parameter is below a threshold value thus no epochs are required to train the propositional LNN (step 320, "YES" branch), the propositional LNN training program 110A, 110B may update the weights of the propositional neural network 122 and terminate. If the propositional LNN training program 110A, 110B determines that this is not the last epoch (step 320, "NO" branch), the propositional LNN training program 110A, 110B may return to step 306 to convert training set into bound vectors for each epoch.

It may be appreciated that FIG. 3 provides only an illustration of one implementation and does not imply any limitations with regard to how different embodiments may be implemented. Many modifications to the depicted environments may be made based on design and implementation requirements.

FIG. 4A depicts a sparse weight matrix of the of the propositional logical neural network training process according to at least one embodiment. As explained within step 304 above, each weight of the node is placed in a sparse weight matrix M at a location [u, v] where node u is a child of node v. The training set 120 is divided into batches of vectors where vector L represents lower parameters of nodes and vector U represents upper parameters of the nodes. This structure enables usage of linear algebra approach in order to enable parallel training of the propositional LNN utilizing and accelerator, such as GPU.

FIG. 4B depicts an example embodiment of distributed processing of the propositional logical neural network training according to at least one embodiment. In instances when the GPU memory is incapable of processing the whole batch, the piecemeal approach may be utilized such as dividing the batch into mini batches such as batch 1 and batch 2 and swapping the minibatches into a GPU for consequential processing.

Figure 5:
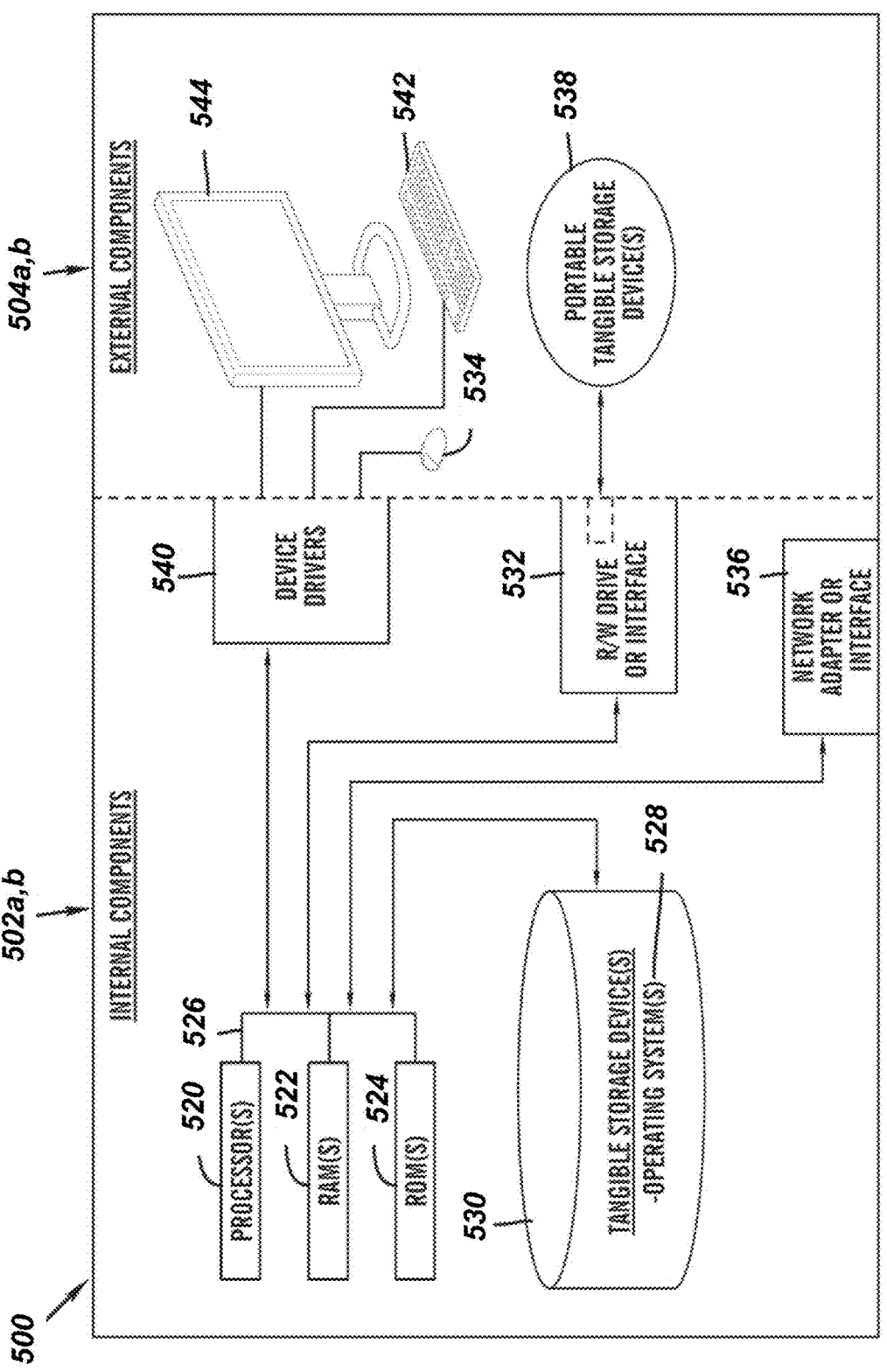
FIG. 5 is a block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502a,b and external components 504a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the propositional LNN training program 110A in the client computing device 102, and the propositional LNN training program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502a,b also includes a RAY drive or interface 532 to read from and write to one or more portable computer-readable tangible storage devices 538 such as a CD-ROM, DVD, memory stick, magnetic tape, magnetic disk, optical disk or semiconductor storage device. A software program, such as the propositional LNN training program 110A, 110B, can be stored on one or more of the respective portable computer-readable tangible storage devices 538, read via the respective RAY drive or interface 532, and loaded into the respective hard drive 530.

Each set of internal components 502a,b also includes network adapters or interfaces 536 such as a TCP/IP adapter cards, wireless Wi-Fi interface cards, or 3G or 4G wireless interface cards or other wired or wireless communication links. The software program 108 and the propositional LNN training program 110A in the client computing device 102 and the propositional LNN training program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the propositional LNN training program 110A in the client computing device 102 and the propositional LNN training program 110B in the server 112 are loaded into the respective hard drive 530. The network may comprise copper wires, optical fibers, wireless transmission, routers, firewalls, switches, gateway computers and/or edge servers.

Each of the sets of external components 504a,b can include a computer display monitor 544, a keyboard 542, and a computer mouse 534. External components 504a,b can also include touch screens, virtual keyboards, touch pads, pointing devices, and other human interface devices. Each of the sets of internal components 502a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
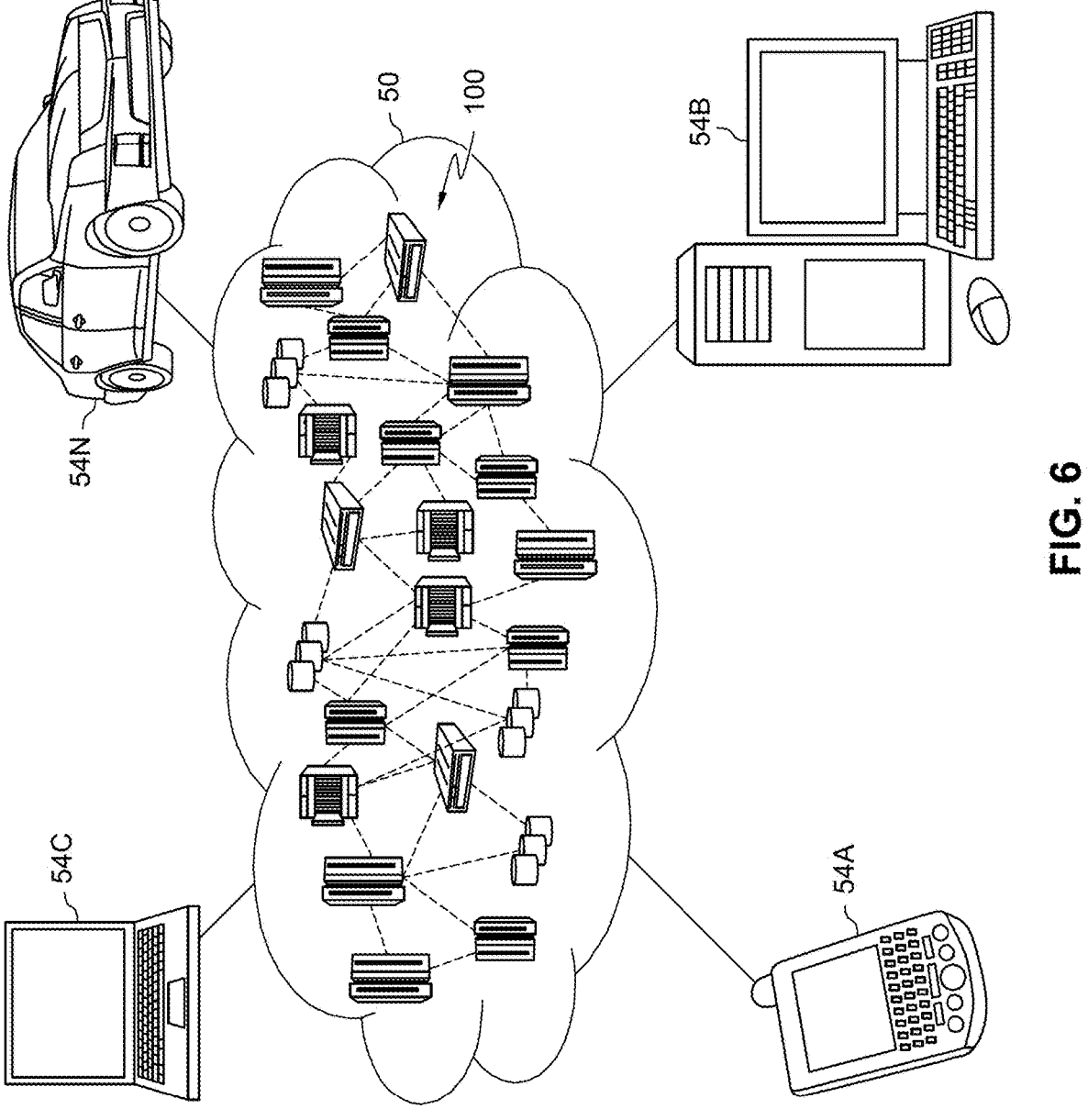
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
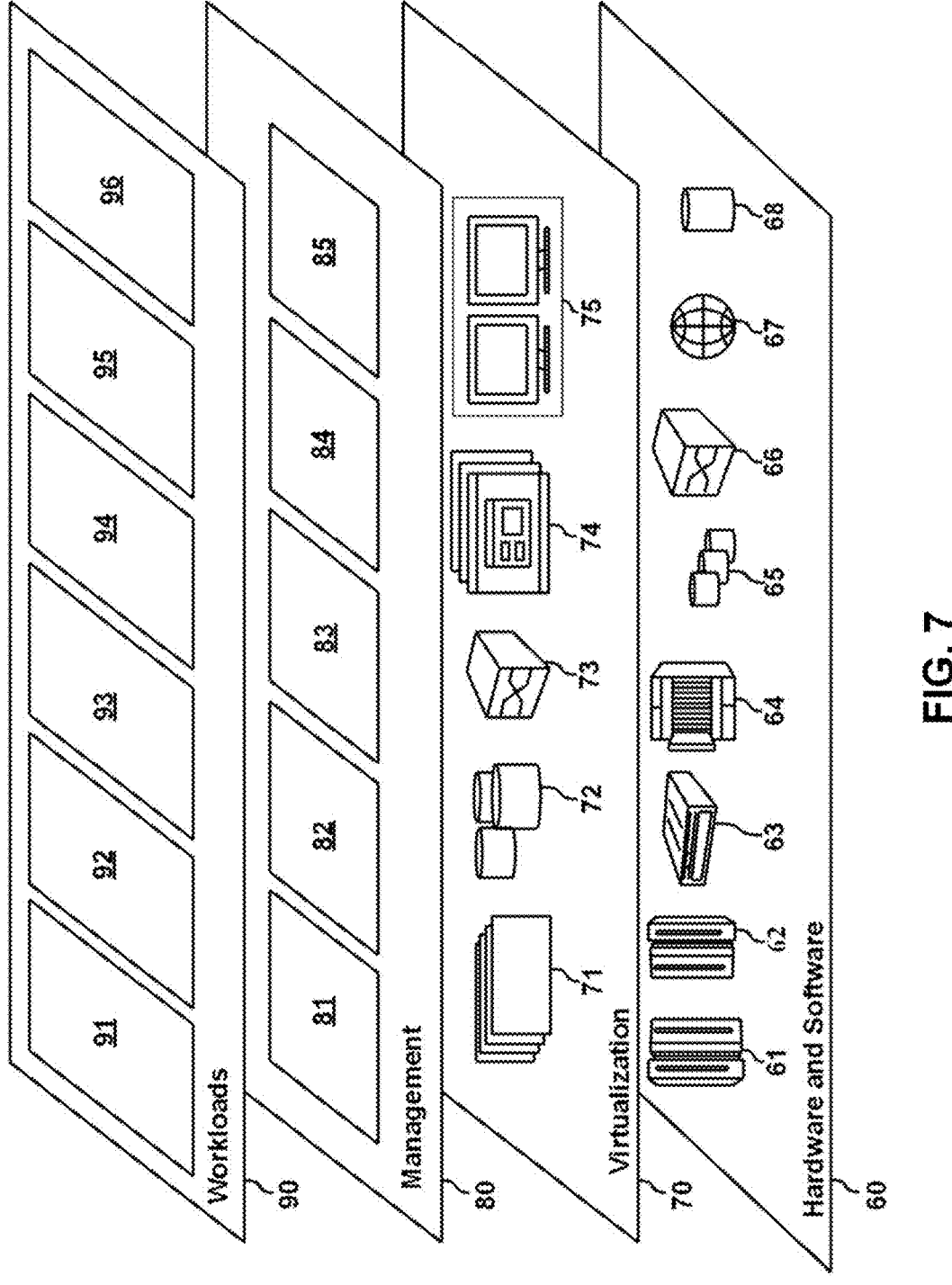
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and propositional logical neural network training 96. Propositional logical neural network training 96 may relate to extracting weights from the neural network and generating a sparse matrix from the weights in order to enable parallel training of the propositional LNN utilizing GPU.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for propositional logical neural network (LNN) training, the method comprising:

identifying a plurality of weights from a propositional LNN, wherein the propositional LNN comprises a plurality of nodes interconnected in layers using logical operators, each node having an associated weight;

converting, by the propositional LNN, the plurality of weights into a sparse matrix, wherein a position of each weight in the sparse matrix is based on a relationship of the nodes to each other, the relationship being whether the node is a child or a parent of the node;

converting, by the propositional LNN, a training set into a plurality of batches of bound vectors for each node, wherein each vector is bounded by an upper parameter of the node and a lower parameter of the node;

updating the sparse matrix with the plurality of bound vectors utilizing linear algebraic kernels of a graphical processing unit (GPU) in parallel;

computing a loss function while the weights are simultaneously updated in the sparse matrix; and based on determining the loss function is below threshold, updating the plurality of weights of the propositional logical neural network.

2. The method of claim 1, wherein the sparse matrix comprises arranging the plurality of weights based on relations between one or more nodes of the propositional logical neural network.

3. The method of claim 1, wherein the propositional logical neural network uses a Lukasiewicz Logic for node activation.

4. The method of claim 1, wherein updating the sparse matrix with the plurality of bound vectors utilizing linear algebraic kernels of the GPU further comprises:

dividing the bound vectors into a plurality of batches based on a memory of the GPU; and swapping in one of the plurality of batches for inference by the GPU.

5. The method of claim 4, wherein the loss function is a superposition of loss parameters calculated for each of the plurality of batches.

6. The method of claim 1, wherein updating of the sparse matrix is further performed using sparse kernel calls.

7. The method of claim 6, wherein updating of the sparse matrix further comprises concurrent update of the plurality of weights without upward and downward inferences.

8. A computer system for propositional logical neural network (LNN) training, the computer system comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

identifying a plurality of weights from a propositional LNN, wherein the propositional LNN comprises a plurality of nodes interconnected in layers using logical operators, each node having an associated weight;

converting, by the propositional LNN, the plurality of weights into a sparse matrix, wherein a position of each weight in the sparse matrix is based on a relationship of the nodes to each other, the relationship being whether the node is a child or a parent of the node;

converting, by the propositional LNN, a training set into a plurality of batches of bound vectors for each node, wherein each vector is bounded by an upper parameter of the node and a lower parameter of the node;

updating the sparse matrix with the plurality of bound vectors utilizing linear algebraic kernels of a graphical processing unit (GPU) in parallel;

computing a loss function while the weights are simultaneously updated in the sparse matrix; and based on determining the loss function is below threshold, updating the plurality of weights of the propositional logical neural network.

9. The computer system of claim 8, wherein the sparse matrix comprises arranging the plurality of weights based on relations between one or more nodes of the propositional logical neural network.

10. The computer system of claim 8, wherein the propositional logical neural network uses a Lukasiewicz Logic for node activation.

11. The computer system of claim 8, wherein updating the sparse matrix with the plurality of bound vectors utilizing linear algebraic kernels of the GPU further comprises:

dividing the bound vectors into a plurality of batches based on a memory of the GPU; and swapping in one of the plurality of batches for inference by the GPU.

12. The computer system of claim 11, wherein the loss function is a superposition of loss parameters calculated for each of the plurality of batches.

13. The computer system of claim 8, wherein updating of the sparse matrix is further performed using sparse kernel calls.

14. The computer system of claim 13, wherein updating of the sparse matrix further comprises concurrent update of the plurality of weights without upward and downward inferences.

15. A computer program product for propositional logical neural network (LNN) training, the computer program product comprising:

one or more computer-readable tangible storage medium and program instructions stored on at least one of the one or more tangible storage medium, the program instructions executable by a processor, the program instructions comprising:

program instructions to identify a plurality of weights from a propositional LNN, wherein the propositional LNN comprises a plurality of nodes interconnected in layers using logical operators, each node having an associated weight;

program instructions to convert, by the propositional LNN, the plurality of weights into a sparse matrix, wherein a position of each weight in the sparse matrix is based on a relationship of the nodes to each other, the relationship being whether the node is a child or a parent of the node;

program instructions to convert, by the propositional LNN, a training set into a plurality of batches of bound vectors for each node, wherein each vector is bounded by an upper parameter of the node and a lower parameter of the node;

program instructions to update the sparse matrix with the plurality of bound vectors utilizing linear algebraic kernels of a graphical processing unit (GPU) in parallel;

program instructions to compute a loss function while the weights are simultaneously updated in the sparse matrix; and based on determining the loss function is below threshold, program instructions to update the plurality of weights of the propositional logical neural network.

16. The computer program product of claim 15, wherein the sparse matrix comprises arranging the plurality of weights based on relations between one or more nodes of the propositional logical neural network.

17. The computer program product of claim 15, wherein the propositional logical neural network uses a Lukasiewicz Logic for node activation.

18. The computer program product of claim 15, wherein program instructions to update the sparse matrix with the plurality of bound vectors utilizing linear algebraic kernels of the GPU further comprises:

program instructions to divide the bound vectors into a plurality of batches based on a memory of the GPU; and program instructions to swap in one of the plurality of batches for inference by the GPU.

19. The computer program product of claim 18, wherein the loss function is a superposition of loss parameters calculated for each of the plurality of batches.

20. The computer program product of claim 15, wherein program instructions to update of the sparse matrix is further performed using sparse kernel calls.

* * * * *